US012681865B2

(12) United States Patent
Toll et al.

(10) Patent No.: US 12,681,865 B2
(45) Date of Patent: Jul. 14, 2026

(54) PROCESSORS WITH TOGGLEABLE MEMORY TAGGING EXTENSIONS AND RELATED METHODS

(71) Applicant: Ampere Computing LLC, Santa Clara, CA (US)

(72) Inventors: Bret Leslie Toll, Hillsboro, OR (US); Benjamin Crawford Chaffin, Portland, OR (US); Jonathan Christopher Perry, Portland, OR (US); David Paul Turley, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 81 days.

(21) Appl. No.: 18/471,998

(22) Filed: Sep. 21, 2023

(65) Prior Publication Data

US 2025/0103506 A1      Mar. 27, 2025

(51) Int. Cl.
 *G06F 12/0895* (2016.01)
 *G06F 12/126* (2016.01)
(52) U.S. Cl.
 CPC ........ *G06F 12/0895* (2013.01); *G06F 12/126* (2013.01)
(58) Field of Classification Search
 CPC ............................ G06F 12/0895; G06F 12/126
 See application file for complete search history.

(56) References Cited

U.S. PATENT DOCUMENTS

| | | | | |
|---|---|---|---|---|
| 6,523,118 B1 * | 2/2003 | Buer | ....................... | G06F 21/85 |
| | | | | 713/192 |
| 9,262,340 B1 * | 2/2016 | van Antwerpen | .. | G06F 12/1491 |
| 11,221,951 B1 | 1/2022 | Abhishek Raja et al. | | |
| 11,726,665 B1 * | 8/2023 | Sabbag | ................. | G06F 3/0652 |
| | | | | 711/154 |

(Continued)

OTHER PUBLICATIONS

Frascino, V. et al., "Memory Tagging Extension (MTE) in AArch64 Linux," Feb. 25, 2020, Retrieved from the Internet: [URL:https:// kernel.googlesource.com/pub/scm/linux/kernel/git/tip/tip/+/refs/tags/ x86_asm_for_v6.1 _rc1 / Documentation/arm64/memory-taggin••extension.rst], 8 pages.

(Continued)

*Primary Examiner* — Aracelis Ruiz
(74) *Attorney, Agent, or Firm* — Withrow & Terranova, PLLC

(57) ABSTRACT

In processors that include a memory tagging extension (MTE), before reading data from or writing data into a memory address, tag bits associated with the memory address are read from the memory and compared to tag bits in the instruction target address. This delays memory write instructions that would not otherwise have to perform a read from the memory circuit before executing the write operation (e.g., full cache line writes), reducing processor performance. An exemplary processing circuit includes a toggleable MTE to provide access to a memory circuit in one of a first mode, in which a memory tagging extension is enabled, and a second mode, in which the MTE is disabled. The processing circuit includes an execution circuit to process a (Continued)

memory instruction and a load/store circuit that does not read the tag bits when MTE is disabled, thereby reducing execution time of the memory instruction.

25 Claims, 5 Drawing Sheets

(56)                    References Cited

U.S. PATENT DOCUMENTS

| | | | |
|---|---|---|---|
| 2006/0184804 A1* | 8/2006 | Varma ................. | G06F 12/0897 |
| | | | 713/193 |
| 2012/0159104 A1* | 6/2012 | Ludloff .............. | G06F 12/1491 |
| | | | 711/163 |
| 2012/0271986 A1* | 10/2012 | Lo ........................... | G06F 12/14 |
| | | | 711/E12.008 |
| 2014/0259149 A1* | 9/2014 | Circello ............. | G06F 12/1458 |
| | | | 726/16 |
| 2020/0081771 A1* | 3/2020 | Kalamatianos ..... | G06F 11/1064 |

OTHER PUBLICATIONS

Partap, A. et al., "Memory Tagging: A Memory Efficient Design," arXiv:2209.00307v2, Nov. 3, 2022, available online: [URL: https://arxiv.org/abs/2209.00307], 16 pages
Extended European Search Report for European Patent Application No. 24201418.1, mailed Feb. 24, 2025, 7 pages.

* cited by examiner

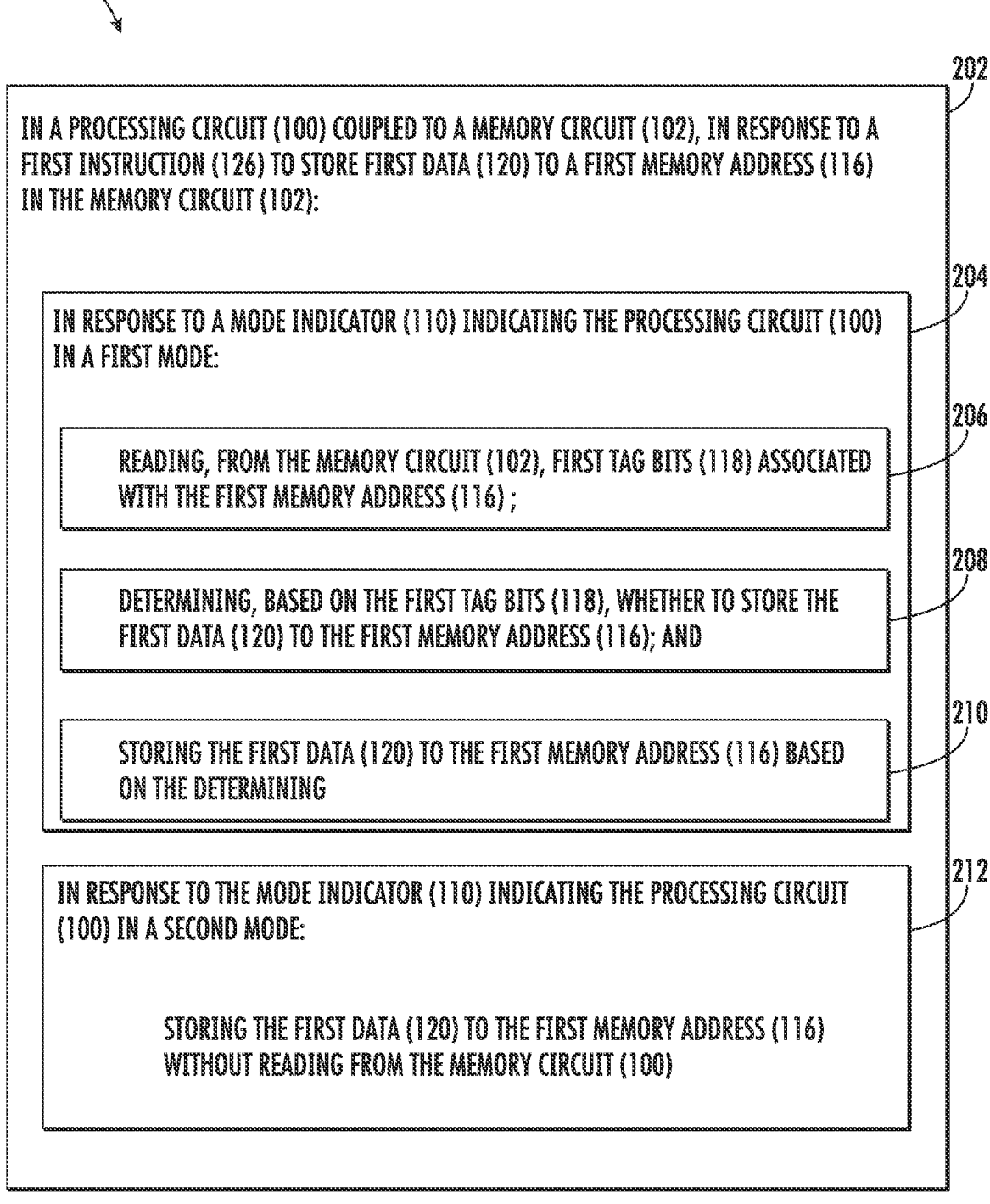

200

202

IN A PROCESSING CIRCUIT (100) COUPLED TO A MEMORY CIRCUIT (102), IN RESPONSE TO A FIRST INSTRUCTION (126) TO STORE FIRST DATA (120) TO A FIRST MEMORY ADDRESS (116) IN THE MEMORY CIRCUIT (102):

204

IN RESPONSE TO A MODE INDICATOR (110) INDICATING THE PROCESSING CIRCUIT (100) IN A FIRST MODE:

206

READING, FROM THE MEMORY CIRCUIT (102), FIRST TAG BITS (118) ASSOCIATED WITH THE FIRST MEMORY ADDRESS (116) ;

208

DETERMINING, BASED ON THE FIRST TAG BITS (118), WHETHER TO STORE THE FIRST DATA (120) TO THE FIRST MEMORY ADDRESS (116); AND

210

STORING THE FIRST DATA (120) TO THE FIRST MEMORY ADDRESS (116) BASED ON THE DETERMINING

212

IN RESPONSE TO THE MODE INDICATOR (110) INDICATING THE PROCESSING CIRCUIT (100) IN A SECOND MODE:

STORING THE FIRST DATA (120) TO THE FIRST MEMORY ADDRESS (116) WITHOUT READING FROM THE MEMORY CIRCUIT (100)

FIG. 2

PROCESSORS WITH TOGGLEABLE MEMORY TAGGING EXTENSIONS AND RELATED METHODS

FIELD OF THE DISCLOSURE

The technology of the disclosure relates to computing systems employing a memory tagging capability for protection against unauthorized access to memory.

BACKGROUND

Society relies on the internet to provide access to millions of computing devices accessible for personal, business, and government applications, including cloud computing and cloud storage. The personal, financial, and medical information of individuals, as well as the confidential information of businesses, governments, and other organizations, are stored online and are expected to be readily accessible whenever needed by an authorized person. At the same time, such information is expected to be secure from all unauthorized attempts to access it. Unfortunately, unauthorized access has been achieved in many ways. One way in which online data can be accessed without permission is by exploiting weaknesses in the computing devices that are used to access, process, and store data. A well-known example of such weaknesses is the ability to access memory locations without authorization.

Specifically, hostile programs can take advantage of unintended features present within instructions and architectures of processing devices to access memory locations that are not intended to be accessible without permission. Designers of processing devices and their architectures have developed numerous techniques and mechanisms for avoiding unauthorized or unintended access to memory locations. One example of such techniques, in a class of processors based on the ARM® architecture, designed and licensed by ARM Ltd., is known as a memory tagging extension (MTE), which is designed to detect memory safety violations. However, while mechanisms such as this may improve security, it may come at the cost of reduced performance.

SUMMARY

Aspects disclosed herein include processing circuits with toggleable memory tagging extensions. Related methods of toggleable memory tagging extensions in processing circuits are also disclosed. In processors and processing circuits that include a memory tagging extension, memory access instructions that write data to a target memory address of a memory circuit obtain first tag bits associated with the memory addresses and determine, based on the first tag bits, whether to store data at the memory address. In some examples, the tag bits are used to determine whether access to the memory address is authorized. The first tag bits are retrieved from the memory by accessing the memory address of the memory circuit. In an exemplary processing circuit, a toggleable memory tagging extension reads the tag bits from the memory circuit, and determines, based on the tag bits, whether to store data at a memory address of a memory circuit in a first mode, in which a memory tagging extension is enabled and, in a second mode, in which the memory tagging extension is disabled, stores the data, without reading from the memory circuit. In particular, the processing circuit includes a mode indicator to indicate one of the first mode and the second mode, an execution circuit, and a load/store circuit. In some examples, the first tag bits read from the memory may be compared to second tag bits in the memory instruction. In the second mode, performance may be improved because memory instructions may be committed without waiting for a comparison of the first tag bits and second tag bits. In particular, disabling the memory tagging extension eliminates the need for a read before a write operation, which saves time in the processor and may improve performance. Employing a toggleable memory tagging extension allows a user to operate the processor in either a first mode in which performance is deprioritized for the sake of improved memory security or a second mode in which performance is prioritized based on a toggleable mode indicator. In this regard, in one exemplary aspect, a processing circuit configured to couple to a memory circuit is disclosed. The processing circuit includes a mode indicator indicating the processing circuit in one of a first mode and a second mode, an execution circuit, and a load/store circuit. Wherein in response to a first instruction to store first data to a first memory address in the memory circuit, the execution circuit is configured to control the load/store circuit to in response to the mode indicator indicating the processing circuit in the first mode read, from the memory circuit, first tag bits associated with the first memory address, determine, based on the first tag bits, whether to store the first data to the first memory address and store the first data to the first memory address based on the determination. Wherein in response to the mode indicator indicating the processing circuit in the second mode store the first data to the first memory address without reading from the memory circuit.

In another exemplary aspect, a method in a processing circuit configured to couple to a memory circuit, the method is disclosed. The method includes in response to a first instruction to store first data to a first memory address in the memory circuit. The method also includes in response to a mode indicator indicating the processing circuit in a first mode reading, from the memory circuit, first tag bits associated with the first memory address, determining, based on the first tag bits, whether to store the first data to the first memory address and storing the first data to the first memory address based on the determining. The method further includes in response to the mode indicator indicating the processing circuit in a second mode storing the first data to the first memory address without reading from the memory circuit.

In another exemplary aspect, a processor-based system is disclosed. The processor-based system includes a memory circuit and a processing circuit. The processing circuit includes a mode indicator indicating the processing circuit in one of a first mode and a second mode, an execution circuit, and a load/store circuit. Wherein in response to a first instruction to store first data to a first memory address in the memory circuit, the execution circuit is configured to control the load/store circuit to, in response to the mode indicator indicating the processing circuit in the first mode, read, from the memory circuit, first tag bits associated with the first memory address. determine, based on the first tag bits, whether to store the first data to the first memory address, and store the first data to the first memory address based on the determination. In response to the mode indicator indicating the processing circuit in the second mode, store the first data to the first memory address without reading from the memory circuit.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 2 is a flow chart of a method of a toggleable MTE in a processing circuit for prioritizing memory security and write performance;

Figure 1:
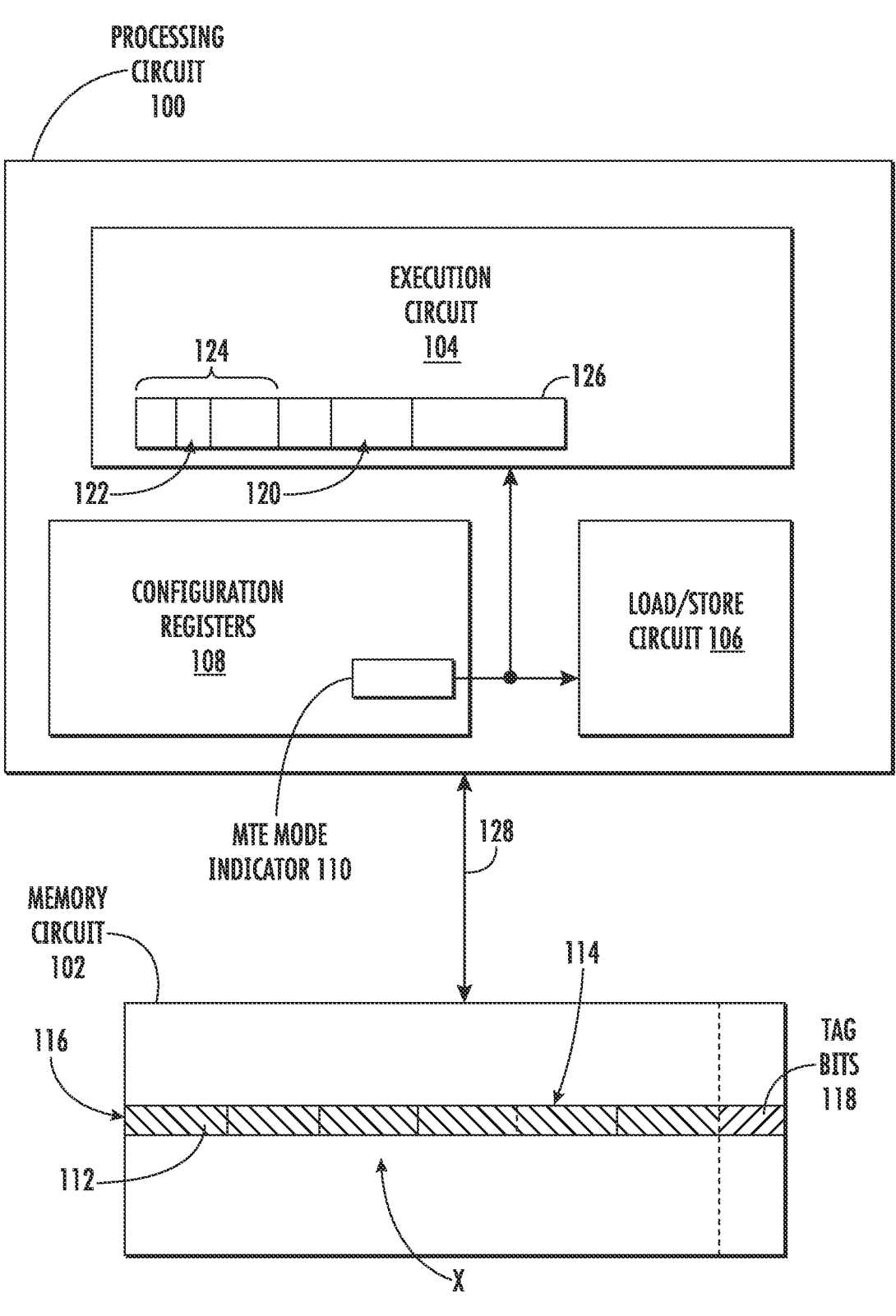
FIG. 1 is a diagram of a processing circuit coupled to a memory circuit and including a toggleable memory tagging extension (MTE) to provide the ability to prioritize memory security or write performance.
Figure 6:
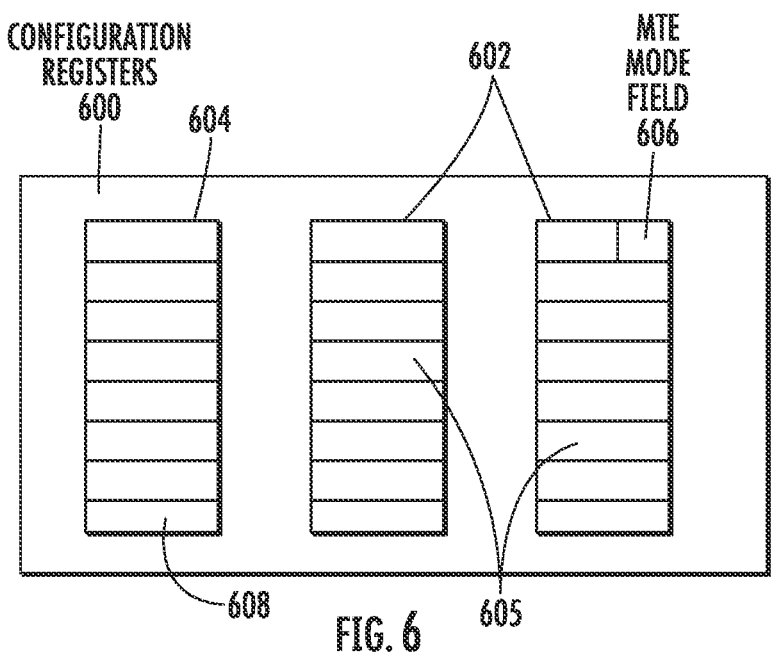
Figure 7:
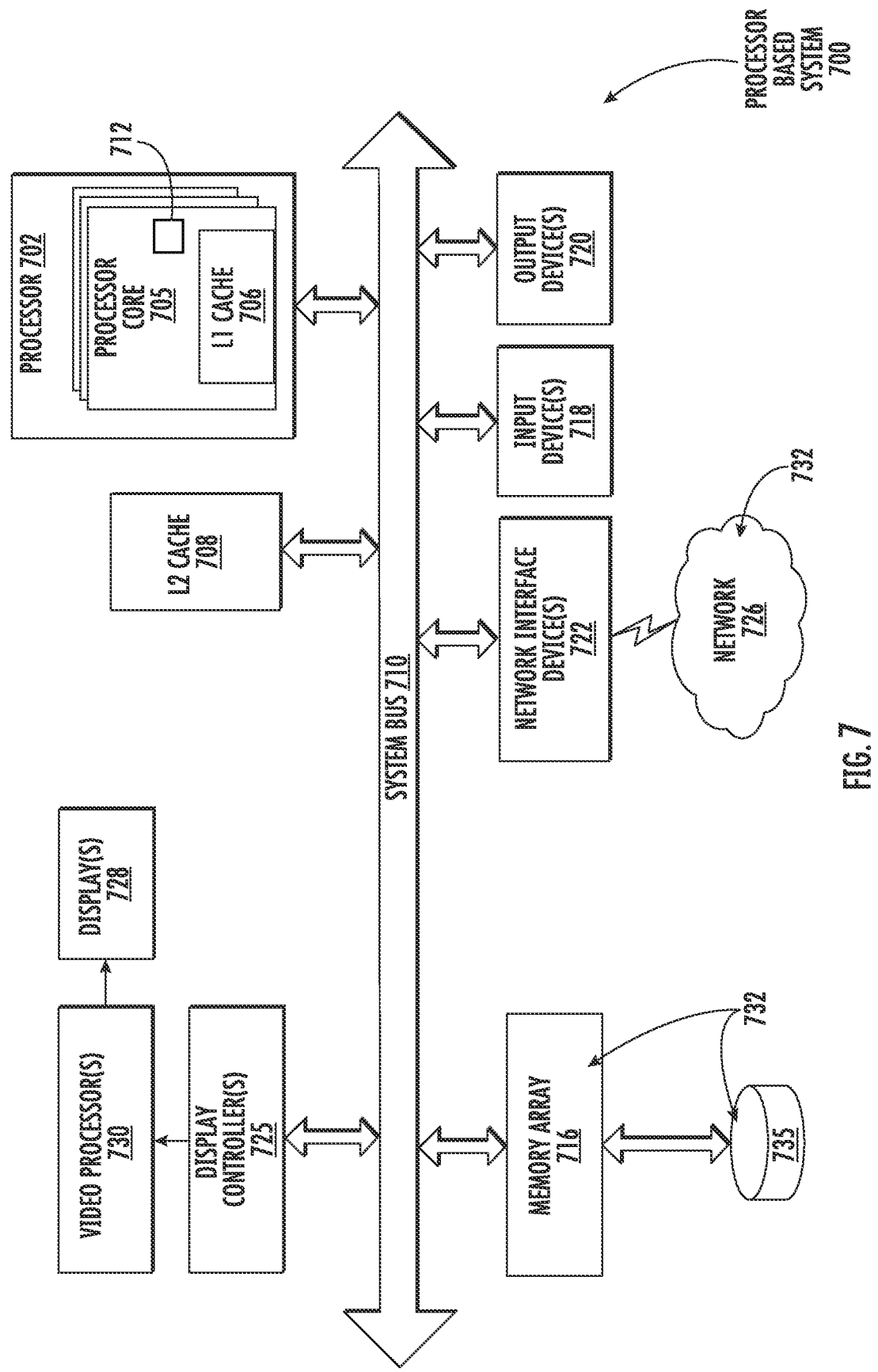

FIG. 6 is a diagram of configuration registers in the processing circuit in FIG. 1, including system configuration registers and MTE configuration registers; and FIG. 7 is a block diagram of an exemplary computer system that includes a processor that includes a plurality of CPU cores coupled to peripheral devices and other resources including a memory system, wherein the CPU cores each include a toggleable MTE to selectively prioritize memory security or write performance.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include processing circuits with toggleable memory tagging extensions. Related methods of toggleable memory tagging extensions in processing circuits are also disclosed. In processors and processing circuits that include a memory tagging extension, memory access instructions that write data to a target memory address of a memory circuit obtain first tag bits associated with the memory addresses and determine, based on the first tag bits, whether to store data at the memory address. In some examples, the tag bits are used to determine whether access to the memory address is authorized. The first tag bits are retrieved from the memory by accessing the memory address of the memory circuit. In an exemplary processing circuit, a toggleable memory tagging extension reads the tag bits from the memory circuit, and determines, based on the tag bits, whether to store data at a memory address of a memory circuit in a first mode, in which a memory tagging extension is enabled and, in a second mode, in which the memory tagging extension is disabled, stores the data, without reading from the memory circuit. In particular, the processing circuit includes a mode indicator to indicate one of the first mode and the second mode, an execution circuit, and a load/store circuit. In some examples, the first tag bits read from the memory may be compared to second tag bits in the memory instruction. In the second mode, performance may be improved because memory instructions may be committed without waiting for a comparison of the first tag bits and second tag bits. In particular, disabling the memory tagging extension eliminates the need for a read before a write operation, which saves time in the processor and may improve performance. Employing a toggleable memory tagging extension allows a user to operate the processor in either a first mode in which performance is deprioritized for the sake of improved memory security or a second mode in which performance is prioritized based on a toggleable mode indicator.

Architectures for processors and processing circuits have been developed to include a memory tagging feature, which may be known as a memory tagging extension (MTE), to improve data security in a wide range of devices and computing systems. Processors and processing circuits that include MTE include those with some architectures provided by ARM Ltd., which may be referred to as "ARM architectures." MTE is an acronym that may be specifically used in reference to ARM architectures but is not intended to be so limiting in this context, and generally refers to the memory tagging capability described herein. That is, while the acronym "MTE" may be employed herein, other memory tagging features by ARM Ltd. or other designers or providers of processors, processing circuits, and/or architectures are also included in the scope of the acronym MTE as used herein. MTE includes employing "tags" or "tag bits" (e.g., metadata) associated with each cache line address in a memory circuit ("memory"). The tag bits may be used to verify that accesses to a memory address are authorized. The tag bits may be determined in the processor or a memory controller when a memory address is allocated for storing data. Use of the tag bits may be determined by each process, for example. Alternatively or additionally, certain regions of memory may be provided the additional level of data security made possible by MTE. However, even those regions that do not include additional data security may implement the tag bits in a processing circuit employing the MTE.

Once values of the tag bits are determined, two copies are maintained. The first tag bits (memory tag bits) are stored in association with the memory address in the memory circuit. MTE specific instructions are used to set or modify the first tag bits. In addition, second tag bits (instruction tag bits) are tracked by the authorized user to obtain to access to the data at the memory address. As described in more detail below, the first tag bits are retrieved (e.g., from the memory circuit) along with the data each time the data in the cache line (e.g., at that memory address) is accessed (read or written). The second tag bits are included in a memory address of a memory access instruction. MTE increases data security because, during memory access instructions, the first tag bits stored in the memory circuit are compared to second tag bits that are included in the target memory address of a memory access instruction. In this manner, the tag bits can be used to verify that the software thread or process attempting to access the data has permission or authorization to access the data. This feature prevents, for example, a memory access instruction directed to a first cache line from overlapping into a second protected cache line. The "tags" employed in MTE are specific bit patterns (sometimes referred to as "colors") attached to particular regions of memory (16B aligned blocks in the specific case of the ARM MTE architecture). In this manner, data belonging to a first process and stored in a particular memory location can be marked with the "color" (tag) associated with the process to ensure that only that first process or a second process with which the first process has shared the color/tag, can successfully access that same memory location (read it or update it).

FIG. 1 is a diagram of a processing circuit 100 coupled to a memory circuit 102. The processing circuit 100 functions in a first mode, in which MTE is enabled, or in a second mode, in which MTE is disabled. The processing circuit 100 includes a mode indicator 110, an execution circuit 104 and a load/store circuit 106. The mode indicator 110 indicates whether the processing circuit 100 is in the first mode or the second mode. In the first mode, when MTE is enabled, first tag bits 118 associated with a memory address 116 are stored in the memory circuit 102. The memory circuit 102 includes a plurality of cache lines 114 that each include, for example, sixteen (16) bytes of data aligned to the memory addresses of the memory circuit 102. In response to data at the target memory address 116 being accessed by a memory instruction (e.g., a store instruction) when the processing circuit 100 is in the first mode, first tag bits 118 associated with the memory address 116 are retrieved (read) from the memory circuit 102 and, based on the first tag bits 118, the processing circuit 100 determines whether to access (e.g., store) the data at the memory address 116, and accesses the data based on the determining. In particular, the determination includes the first, memory tag bits 118 being compared to second, instruction tag bits 122 provided as part of the memory address 124 in the memory access instruction 126. If the first tag bits 118 do not match the second tag bits 122, the processing circuit 100 may determine to not complete the memory instruction and may generate an exception signal or an error indication. The load/store circuit 106 stores the data to the memory address 116 in response to the first tag bits 118 matching the second tag bits 122.

In the second mode (MTE disabled), writes to a memory address can be performed without first performing a comparison of the first tag bits 118 and the second tag bits 122. Thus, write instructions can avoid having to read from the memory circuit before writing to the memory circuit. That is, in response to the mode indicator 110 indicating the processing circuit 100 is in the second mode, the load/store circuit 106 stores data in the memory circuit without first reading from the memory circuit. In particular, when all the bytes associated with a memory address are being overwritten, modified, or updated, there is no need to perform a read operation before executing the write operation, which provides new data to the memory circuit 102. In contrast, for a partial write, data in the memory address that is not to be changed by the memory access instruction is read from the memory circuit before new data is written to the memory address.

The processing circuit 100 includes configuration registers 108, which include an MTE mode field 110 (or mode bit, for example) that may be set or programmed to indicate whether the processing circuit 100 is in the first, enabled mode or the second, disabled mode. The MTE mode field 110 may be programmed, for example, by firmware or boot code when the processing circuit 100 is initially booting up after being powered on or reset. Thus, the MTE mode field 110 may be toggled (e.g., written, updated, or switched between a first state to a second state, such as binary "0" and binary "1") by the boot code to enable or disable MTE during booting up of the processing circuit 100. The MTE mode field 110 is not toggled after booting up is complete or during normal operation. For example, if data is stored in the memory circuit 102 with MTE disabled, no tag bits would be stored in association with the data. If MTE is subsequently enabled, access to such data would fail to provide the expected tag bits.

On the other hand, an attempt to switch from the first mode (MTE enabled) to the second mode would result in error signals generated by an error correction algorithm that uses the first tag bits 118 as error correction bits, expecting them to have values corresponding to the data. In addition, software layers such as a hypervisor and the operating system expect the configuration register 108 to remain static, and they may identify any change to the contents of the configuration register 108 to be an error condition.

Additionally, when MTE is enabled (e.g., in the first mode), the processing circuit 100 operates according to the assumption that all memory is tagged even though some processes may access memory without checking/verifying the tag bits. For example, a first process that receives the first tag bits 118 stored with data at a first memory address 116 in the memory circuit 102 may provide those first tag bits 118 to a second process that is authorized to access the same data. In some examples, the second process may not implement tag checking. However, even if the second process does not perform a check of the first tag bits 118 associated with that memory address 116, the first tag bits 118 are retrieved from the memory and must be correctly restored or maintained by the second process. For example, if the second process executes any memory operation, including a read, a partial cache-line write, or a full cache line write to the memory address 116, regardless of the number of data bits that are updated, the second process must ensure that the first tag bits 118 associated with that memory address 116 are unchanged so that a subsequent check/verification of the first tag bits 118 by the first process or another authorized process will be successful.

The execution circuit 104 is configured to process instructions provided by different levels of software, including firmware, hypervisors, operating systems, user applications, etc. While some of such instructions simply manipulate data stored in registers within the processor, memory access instructions are employed to load data into those registers from memory and write back data from those registers into memory. In some examples, the results of an instruction may be written directly to memory. The load/store circuit 106 is employed to access the memory circuit 102 (e.g., to perform the reads and writes to memory) in response to instructions being processed in the execution circuit 104. For example, existing data 112 (e.g., a few bytes) of the cache line 114 at the memory address 116 in the memory circuit 102 may be replaced with new data 120 in response to the memory write instruction 126 processed in the execution circuit 104. The new data 120 may be included in the memory write instruction 126 or accessed from another location in response to the memory write instruction 126.

When such memory write instruction 126 is executed in the first mode, in which MTE is enabled, prior to storing the new data 120 to the cache line 114, the load/store circuit 106 may read the entire cache lines 114, including the existing data 112, and the first tag bits 118 from the memory circuit 102. The cache line 114 may be modified to replace the existing data 112 with the new data 120 before writing the modified cache line 114 back to the memory address 116. In some cases, depending on the process that is accessing memory or depending on the region of memory being accessed, one of the load/store circuit 106, the execution circuit 104, or some other circuitry (not shown) within the processing circuit 100 may compare the first tag bits 118 to the second, instruction tag bits 122 included as part of the memory address 124 in the memory access instruction 126. For example, the instruction tag bits 122 may be provided in an operand in the memory access instruction. As noted above, even in the first mode, it may not be necessary for the first tag bits 118 to be compared to the instruction tag bits 122 in all memory access operations. However, in case the software is going to perform such checking, the first tag bits 118 associated with the memory location 116 are read along with the existing data 112 in the first mode. In the example shown in FIG. 1, reading the first tag bits 118 along with the existing data 112 may refer to retrieving the first tag bits 118 together with the existing data 112 in a same transfer of data across a data bus 128, or receiving the first tag bits 118 in a separate transfer across the data bus 128.

In the second mode, when MTE is disabled, the load/store circuit 106 is configured to store new data 112 to the cache line 114 without reading the tag bits 118 associated with the memory address 116. In the second mode, MTE is disabled, so the software does not (or should not) include MTE instructions that verify whether access to memory locations is authorized. Since the load/store circuit 106 does not need to insert a read operation just for the purpose of obtaining the tag bits 118 before writing data 112 to memory, the load/store circuit 106 can complete write operations to the cache line 114 with less delay, which improves overall performance of the processing circuit 100. The processing circuit 100 may be booted up in the second mode in some situations, for example, when it is determined that the memory security (e.g., memory protection) benefits of MTE are a lower priority than the performance of all applications that will be run. It should be noted that the performance benefit of avoiding the read operation to retrieve the tag bits 118 may only be realized in certain circumstances, such as when the data 112 does not need to be accessed before it is updated. For example, when all bits/bytes of the data 112 in a cache line 114 are to be updated by a write instruction, there may be no need to access the data 112 that is about to be updated. In this regard, the performance benefit recovered by having a toggleable MTE may not be realized for writes to only a portion (e.g., less than all) of the data 112 in the cache line 114.

In more detail, in the second mode, the cache line 114 and other cache lines (not shown) within the memory circuit 102 may each have a capacity to store a number X (e.g., 16) bytes of data 112. The load/store circuit 106 may be configured to write all X bytes of data 112 of the cache line 114 in every memory write instruction because, in some memory circuits 102, the memory circuit 102 cannot accept a partial write operation. In other words, the memory circuit 102 may not be able to receive a partial write to the cache line 114, which is a write instruction that updates only some of the bytes of the cache line 114 and leaves the unwritten bytes in their previous state. Thus, in order to overwrite or update less than the entirety of the X bytes of the data 112, the load/store circuit 106 will first read all X bytes of the data 112, replace the updated bytes with new data to generate an updated data 112, and write back the entire updated cache line 114 to the memory circuit 102 (known as read-modify-write).

Since partial writes to the cache line 114 require the data 112 to be read before the full cache line 114 can be written, whether the tag bits 118 need to be accessed or not, partial write instructions do not realize the same performance benefit realized by writes to all X bytes of the cache line 114 in the second mode (when MTE is disabled). When all X of the bytes of the data 112 are to be updated by a write instruction, a write operation can be performed without first reading the existing data 112 or the tag bits 118. In addition, because the tag bits 118 are not maintained in the memory circuit 102, in the second mode (MTE disabled), the performance of full cache line write (store) operations and partial cache line writes are improved because it is not necessary to wait until completion of the tag check before write operations can be committed.

FIG. 2 is a flow chart illustrating a method 200 in a processing circuit 100 coupled to a memory circuit 102. The method 200 comprising, in response to a first instruction 126 to store first data 120 to a first memory address 116 in the memory circuit 102 (block 202), and in response to a mode indicator 110 indicating the processing circuit 100 in a first mode (block 204), reading, from the memory circuit 102, first tag bits 118 associated with the first memory address 116 (block 206), determining, based on the first tag bits 118, whether to store the first data 120 to the first memory address 116 (block 208), and storing the first data 120 to the first memory address 116 based on the determining (block 210). The method 200 further comprises, in response to the mode indicator 110 indicating the processing circuit 100 in a second mode: storing the first data 120 to the first memory address 116 without reading from the memory circuit 100 (block 212).

Figure 3:
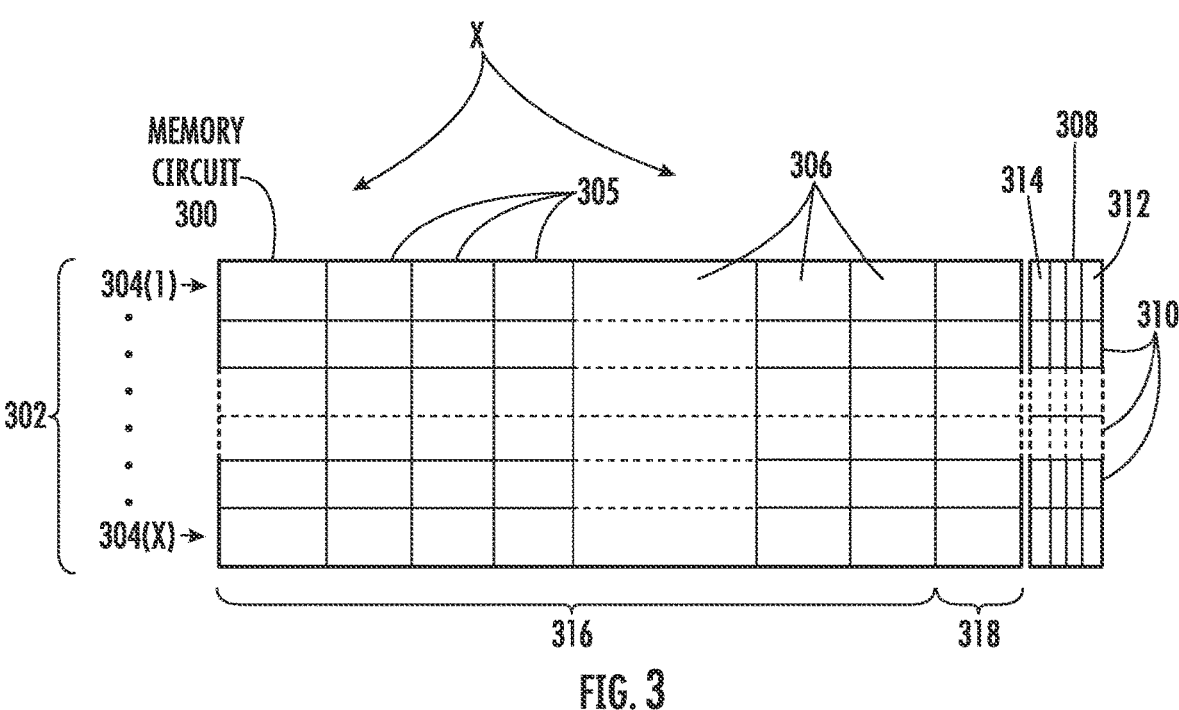
FIG. 3 is a diagram of a memory circuit including data stored in cache lines and tag bits associated with the cache line stored in entries outside the cache line.
Figure 4:
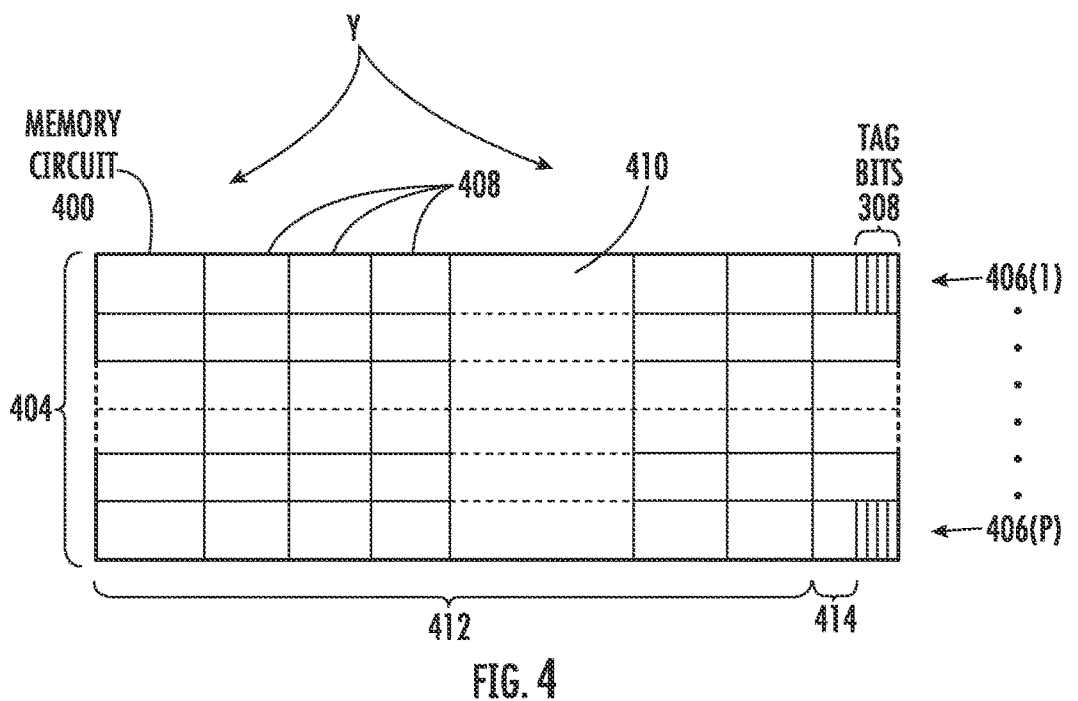
FIG. 4 is a diagram of a memory circuit in which cache lines include data and associated tag bits for MTE.

FIGS. 3 and 4 are examples of memory circuits in which tag bits are stored in association with memory addresses. In FIG. 3, a memory circuit 300 includes a plurality of cache lines 302 at respective memory addresses 304(1)-304(M). Each of the cache lines 302 has the capacity to store a number X bytes of binary information 306 including the data 112 referred to with reference to FIG. 1. In addition, separate from the cache lines 302, the memory circuit 300 includes a storage circuit 308 having entries 310 configured to store metadata bits 312 associated with each of the corresponding memory addresses 304(1)-304(M). The entries 310 may be additional storage within the memory circuit 300. Alternatively, the storage circuit 308 may be a separate circuit from the memory circuit 300. In either example, the load/store circuit 106 is configured to store the first tag bits 308 in addition to the first number X bytes of the cache line 302 at one of the memory address 304(1)-304(M).

In some examples, when MTE is enabled, the metadata bits 312 may include tag bits 314. In some examples, the metadata bits 312 associated with one of the memory addresses 304(1)-304(M) may be read and written along with the binary information 306. In other words, a separate operation may not be needed to read or write the metadata bits 312 associated with one of the memory addresses 304(1)-304(M). When the corresponding binary information 306 is read from or written to one of the memory addresses 304(1)-304(M), the metadata bits 312 are also accessed by the same operation. In other examples, a separate read operation may be needed to acquire the tag bits 314 associated with a cache line 302 when the binary information 306 is read from the memory circuit 300 and a separate write operation may be needed to store the tag bits 314 associated with a cache line 302 when the binary information 306 is written to the memory circuit 300.

The memory circuit 300 in FIG. 3 may sacrifice area and power in an integrated circuit by including the storage circuit 308 for the tag bits 314 for MTE, but such design makes it possible to store the tag bits 314 without reducing the amount of data stored in a cache line. It should be understood that the binary information 306 (which may correspond to the data 112 in FIG. 1) stored in the cache lines 302 includes data 316, which is generated by and used by the execution circuit 104 in FIG. 1, and may also include parity and/or error correction code (ECC) bits ("error control bits") 318.

In contrast, the memory circuit 400 in FIG. 4 is an example in which tag bits 402 are included in cache lines 404, rather than being stored in a separate circuit. The cache lines 404 are accessed at memory addresses 406(1)-406(P). Each of the cache lines 404 includes a number Y of bytes 408 in which binary information 410 may be stored. In this example, the binary information 410 may include data 412 provided by a processing circuit, parity, and/or ECC bits ("error control bits") 414 provided for protecting the data 412, and tag bits 416 used for MTE. In other words, the tag bits 402 are also stored in the cache line 404 and accessed along with the data 412 and error control bits 414 when a memory access instruction is directed to one of the memory addresses 406(1)-406(P). The tag bits 402 are read and written in the same memory operations that access the data 412. That is, the load/store circuit 106 is configured to store the first tag bits 402 in the number Y bytes of the cache line 404 at one of the memory address 406(1)-406(P).

The memory circuit 400 has reduced area and power requirements compared to the memory circuit 300 because there are no additional circuits corresponding to the storage circuit 308 in FIG. 3 for storing the tag bits 402. However, in the absence of this additional storage capacity corresponding to the storage circuit 308 in FIG. 3, the memory circuit 400 may provide reduced parity and/or ECC protection compared to the memory circuit 300 in the first mode. That is, in examples of the cache lines 404 having a same capacity as the cache lines 302 and the data 412 being a same number of bytes, storing a number T of the tag bits 402 in the cache lines 404 requires a number of the error control bits 414 to be reduced by T bits. In other words, while a number P1 of the error control bits 318 may be included in the cache lines 302 in the memory circuit 300 in FIG. 3, a number P2 (=P1−T) of error control bits 414 may be included in the cache lines 404 in the memory circuit 400 in FIG. 4. Reducing the number of error control bits 414 may reduce the level of error protection in the memory circuit 400 compared to the memory circuit 300 if a same error protection scheme (algorithm) is employed. In some examples, however, the data 412 in the memory circuit 400 may be provided a similar level of error protection as the binary information 306 in the memory circuit 300, despite a reduction in the number of error control bits 414, by employing an alternative algorithm or protection method in the memory circuit 400 than in the memory circuit 300.

Thus, the processing circuit 100 in FIG. 1 is configured to employ a first data protection algorithm comprising a first number of error control bits P1 to protect data in the first mode and employ a second data protection algorithm comprising a second error protection algorithm comprising a second number (different than the first number) of error control bits P2 to protect the data in the second mode.

Figure 5:
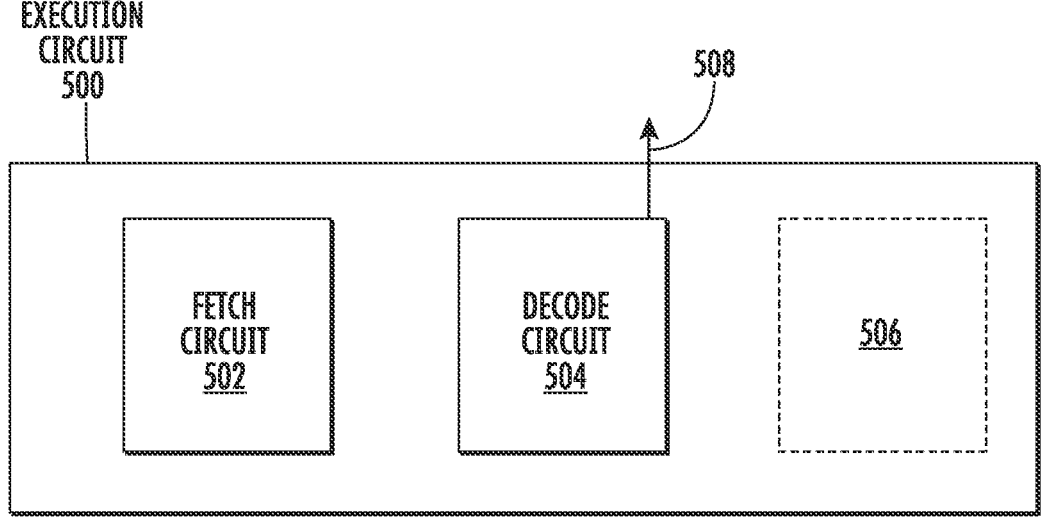
FIG. 5 is a diagram of an execution circuit in the processing circuit in FIG. 1, in which MTE is toggleable to prioritize memory security or write performance.

FIG. 5 is a diagram of an execution circuit 500 that may be employed in the processing circuit 100 in FIG. 1, which may function in the first mode to support MTE or in the second mode in which performance is prioritized. The execution circuit 500 is configured to process instructions associated with controlling MTE function and memory access instructions in which the tag bits may be employed to verify access authorization. Further details regarding control of the MTE is provided in reference to FIG. 6.

The execution circuit 500 includes a fetch circuit 502 that receives instructions to be processed by the execution circuit 500. The fetch circuit 502 may issue requests for instructions stored in sequential memory addresses. Alternatively, the fetch circuit may request instructions from other, non-sequential memory addresses or registers based on branch results and branch prediction. The execution circuit 500 also includes a decode circuit 504 that receives instructions from the fetch circuit 502 and decodes the instructions. For example, decoding the instructions in the decode circuit 504 includes examining fields and bits of instructions that contain information about the instruction, such as a type of instruction. The decode circuit 504 may also determine sources and destinations of data processed by an instruction. The decode circuit 504 may provide the decoded information to other circuits in the execution circuit 500. For example, the decode circuit 504 can determine whether tag bits stored in association with the data may be compared against tag bits in the instruction. For example, the decode circuit 504 may determine whether a region of memory protected by the tag bits used in the MTE is to be accessed.

In the first mode, in which MTE is enabled, the decode circuit 504 begins processing the instruction and forwards the instruction to a next processor pipeline circuit 506. In the first mode, the load/store circuit 106 in FIG. 1 may be engaged to access a memory circuit to retrieve first tag bits in a memory address being accessed by the instruction and compare the first tag bits to second tag bits contained in an instruction memory address (e.g., to confirm authorization to access the memory address). Also in the first mode, the decode circuit 504 and the load/store circuit 106 may recognize that fields associated with MTE, such as the first tag bits 118 or certain fields of the configuration registers 108 in FIG. 1, are being accessed and continue to process the instruction In the second mode, however, the decode circuit 504 recognizes that execution circuit 500 is in the second mode, in which MTE is disabled. In response to an instruction to access the tag its 118 or fields associated with MTE (e.g., in the configuration registers 108), the decode circuit 504 may generate an exception signal 508 because such MTE instruction cannot be executed. In addition, in the second mode, the decode circuit 504 and load/store circuit 106 process memory access instructions without maintaining tag bits in the memory or including them in memory access instructions. Thus, in the second mode, no tag check is performed when MTE is disabled.

FIG. 6 is a diagram of configuration registers 600, which could be the configuration registers 108 in the processing circuit 100 in FIG. 1. The configuration registers 600 include system configuration registers 602 and MTE configuration registers 604, for example. The system configuration registers 602 store system control information 605 including an MTE mode indicator 606 (or mode bit) that is configured to indicate whether the processing circuit 100 is in the first, enabled mode indicating that the MTE is enabled, or the second, disabled mode indicating that the MTE is disabled. In such example, the system control information 605, including the MTE mode indicator 606, may be written or set to appropriate values by firmware or "boot code" during a boot mode of the processing circuit 100 in FIG. 1. A boot mode is entered when the processing circuit 100 is being configured for operation after power is turned on or a reset has occurred. In this manner, a boot mode indicator in the MTE mode indicator 606 may be toggled between a binary "1" to indicate the first, enabled mode and a binary "0" to indicate the second, disabled mode. Alternatively, a "0" in the MTE mode indicator 606 may indicate the first mode and a "1" may indicate the second mode.

The MTE configuration registers 604 may store MTE control information 608 to control implementation of the MTE and tag bits. For example, in a family of processor architectures in which different versions of MTE may be employed, there may be different MTE capabilities. In this regard, software configured to be compatible with the processors having one or more of such architectures may need to identify the version employed in a processor and operate accordingly. Software employing the MTE may query the MTE control information 608 to identify which version of MTE is implemented in a processor on which the software is being executed to identify its capabilities or features. Thus, to ensure that the MTE instructions are compatible with the version executing in a processing circuit, the software may query the MTE configuration registers 604. In addition to version information, the MTE control information 608 may indicate configurable features of the MTE, such as a number of tag bits employed. Other configurable features that may be identified include an indication of the immediacy of error reporting (e.g., per instruction or "asynchronously") and a setting to disable checking of the tags (e.g., by the operating system or a hypervisor). Tag caching details may also be indicated.

In the first mode, when the processing circuit 100 in FIG. 1 executes memory access instructions, the first tag bits 118 may be compared to the second tag bits 122. Also in the first mode, the processing circuit 100 executes MTE specific instructions for accessing (reading or writing) MTE control information 608 stored in one of the MTE configuration registers 604 or the first tag bits 118 stored in the memory circuit 102 in association with memory addresses. The MTE control information 608 may be operative only in the first mode and not operative in the second mode.

In the second mode, since MTE is not enabled, the processing circuit 100 does not execute MTE specific instructions that use or update the tag bits 118 of FIG. 1. In one example, in the second mode, in response to receiving MTE specific instructions to access the control information 608 in the MTE configuration registers 604, or to access the tag bits 118 stored in the memory circuit, the execution circuit 500 in FIG. 5 may be configured to disregard (e.g., not act on) such instructions and/or the decode circuit 504 may generate a fault or exception signal. In another example, in response to an instruction to write control information into the MTE configuration register 604, the processing circuit 100 may be configured to not write to the MTE configuration register 604, causing the MTE control information 608 to remain unchanged. In response to instructions to read the MTE control information 608 in the second mode, the MTE control information 608 may not be returned. Instead, predetermined or reserved values (e.g., zeroes) may be returned. In addition, in some examples, instructions attempting to access the MTE control information 608 in the second mode may cause an exception to be generated.

In another example, the system configuration registers 602 may include system control information 605 used in both the first mode and the second mode. In response to instructions attempting to access the system configuration registers 602 while in the second mode, fields and bits of the system control information 605 that are operative or employed in the second mode may be updated or returned successfully. In contrast, any of the system control information 605 explicitly used for the first mode may not be changed in response to a write operation and may return reserved values in response to a read operation.

FIG. 7 is a block diagram illustrating an example of a processor-based system 700 that can include a processor 702, as a non-limiting example. The processor 702 includes one or more processor cores 705, each including a level one (L1) cache 706. The processor cores 705 request data from their corresponding L1 cache 706. When the requested data is not contained in the L1 cache 706 (e.g., a miss occurs), a request for the data is forwarded to an L2 cache 708 through communications on a system bus 710. Any of the processor cores 705 may be the processing circuit 100 in FIG. 1 and, in this regard, may include an MTE mode indicator 712 corresponding to the MTE mode indicator 110 in FIG. 1. In addition, the L1 cache 706 in each of the processor cores 705 and the L2 cache 708 may be configured according to the memory circuit 102 in FIG. 1, to support MTE. The system bus 710 may be busy with communications between other devices coupled to the system bus 710. As illustrated in FIG. 7, these devices can include the memory array 716, to which the prefetch requests may be directed. The devices coupled to the system bus 710 may also include one or more input devices 718, one or more output devices 720, one or more network interface devices 722, and one or more display controllers 725, as examples. The input device(s) 718 can include any type of input device, including, but not limited to, input keys, switches, voice processors, etc. The output device(s) 720 can include any type of output device, including, but not limited to, audio, video, other visual indicators, etc. The network interface device(s) 722 can be any device(s) configured to allow an exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 722 can be configured to support any type of communications protocol desired.

The processor 702 may also be configured to access the display controller(s) 725 over the system bus 710 to control information sent to one or more displays 728. The display controller(s) 725 sends information to display(s) 728 to be displayed via one or more video processors 730, which process the information to be displayed into a format suitable for the display(s) 728. The display(s) 728 can include any type of display, including, but not limited to, a cathode ray tube (CRT), a liquid crystal display (LCD), a plasma display, a light emitting diode (LED) display, etc.

The memory array 716 of the processor-based system 700 may include a set of computer-readable instructions 732 stored in a non-transitory computer-readable medium 735 (e.g., a memory). Also, other components of the processor-based system 700 in FIG. 7 can include computer-readable instructions 732 stored in a non-transitory computer-readable medium 735 (e.g., a memory) that can be accessed by the processor 702 to be executed to perform tasks that require instructions and/or data from the memory array 716. These computer-readable instructions 732 can be stored in the non-transitory computer-readable medium 735. The computer-readable instructions 732 may further be transmitted or received over the network 726 via the network interface device 722, such that the network 726 includes the non-transitory computer-readable medium 735. The computer-readable instructions 732 may further be transmitted or received from the input device 718.

While the non-transitory computer-readable medium 735 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. For example, the initiator and target devices described herein may be employed in any circuit, hardware component, integrated circuit (IC), or IC chip. A processor is a circuit that can include a microcontroller, a microprocessor, or other circuits that can execute software or firmware instructions. A controller is a circuit that can include a microcontroller, a microprocessor, and/or dedicated hardware circuits (e.g., a field programmable gate array (FPGA)) that do not necessarily execute software or firmware instruction. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic devices, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A processing circuit configured to couple to a memory circuit, the processing circuit comprising:
   a mode indicator indicating the processing circuit in one of a first mode and a second mode;
   an execution circuit; and
   a load/store circuit;
   wherein:
      in response to a first instruction to store first data to a first memory address in the memory circuit, the execution circuit is configured to control the load/store circuit to:
         in response to the mode indicator indicating the processing circuit in the first mode:
            read, from the memory circuit, first tag bits associated with the first memory address;
            determine, based on the first tag bits, whether to store the first data to the first memory address; and
            store the first data to the first memory address based on the determination; and
         in response to the mode indicator indicating the processing circuit in the second mode:
            store the first data to the first memory address without reading from the memory circuit; and
      the first tag bits associated with the first memory address are stored in a same cache line as the first data.

2. The processing circuit of claim 1, wherein:
   the memory circuit comprises a plurality of cache lines, each comprising a first number of bytes; and
   the load/store circuit is further configured to store the first data comprising the first number of bytes at the first memory address.

3. The processing circuit of claim 2, wherein the load/store circuit is configured to store the first tag bits in addition to the first number of bytes at the first memory address.

4. The processing circuit of claim 2, wherein the load/store circuit is configured to store the first tag bits in the first number of bytes at the first memory address.

5. The processing circuit of claim 1, wherein:
the processing circuit comprises an ARM® architecture comprising a memory tagging extension (MTE);
the MTE is enabled in the first mode; and
the MTE is disabled in the second mode.

6. The processing circuit of claim 1, wherein the load/store circuit is further configured to:
compare the first tag bits associated with the first memory address to second tag bits associated with the first instruction to determine whether to store the first data to the first memory address; and
store the first data to the first memory address in response to the first tag bits matching the second tag bits.

7. The processing circuit of claim 1, further configured to employ a first data protection algorithm comprising a first number of error control bits to protect the first data in the first mode and employ a second error protection algorithm comprising a second, different number of error control bits to protect the first data in the second mode.

8. The processing circuit of claim 1, wherein:
the first instruction is directed to updating the first tag bits;
the execution circuit comprises:
a fetch circuit configured to receive the first instruction; and
a decode circuit configured to decode the first instruction; and
in response to determining the processing circuit is in the second mode, the decode circuit generates an exception signal.

9. The processing circuit of claim 1, further comprising a first configuration register comprising the mode indicator.

10. The processing circuit of claim 9, wherein the execution circuit is further configured to update the first configuration register in a boot mode of the processing circuit.

11. The processing circuit of claim 1, further comprising a second configuration register configured to store first control information to control implementation of the first tag bits, wherein the execution circuit is further configured to, in response to a second instruction to access the first control information in the second configuration register:
in response to the processing circuit in the first mode, access the first control information; and
in response to the processing circuit in the second mode, generate an exception signal.

12. The processing circuit of claim 1, further comprising system configuration registers comprising second control information operative only in the first mode, wherein the execution circuit is further configured to:
in response to a second instruction to update the second control information:
in response to the processing circuit in the second mode, disregard the second instruction; and
in response to a third instruction to read the second control information:
in response to the processing circuit in the second mode, return predetermined values.

13. A method in a processing circuit configured to couple to a memory circuit, the method comprising:
in response to a first instruction to store first data to a first memory address in the memory circuit:

in response to a mode indicator indicating the processing circuit in a first mode:
reading, from the memory circuit, first tag bits associated with the first memory address;
determining, based on the first tag bits, whether to store the first data to the first memory address; and
storing the first data to the first memory address based on the determining; and
in response to the mode indicator indicating the processing circuit in a second mode:
storing the first data to the first memory address without reading from the memory circuit,
wherein the first tag bits associated with the first memory address are stored in a same cache line as the first data.

14. The method of claim 13, wherein:
the memory circuit comprises a plurality of cache lines each comprising a first number of bytes; and
storing the first data comprising the first number of bytes at the first memory address.

15. The method of claim 14, wherein:
the processing circuit comprises an ARM® architecture comprising a memory tagging extension; and
storing the first data to the first memory address further comprises:
in the first mode, determining that the memory tagging extension is enabled; and
in the second mode, determining that the memory tagging extension is disabled.

16. The method of claim 14, further comprising storing the first tag bits in addition to the first number of bytes at the first memory address.

17. The method of claim 14, further comprising storing the first tag bits in the first number of bytes at the first memory address.

18. The method of claim 13, further comprising:
comparing the first tag bits associated with the first memory address to second tag bits associated with the first instruction to determine whether to store the first data to the first memory address; and
storing the first data to the first memory address in response to the first tag bits matching the second tag bits.

19. The method of claim 13, further comprising employing a first data protection algorithm comprising a first number of error control bits to protect the first data in the first mode and employing a second error protection algorithm comprising a second, different number of error control bits to protect the first data in the second mode.

20. The method of claim 13, wherein the first instruction is directed to updating the first tag bits and, in response to the processing circuit in the second mode, generating an exception signal.

21. The method of claim 13, further comprising setting a first configuration register comprising the mode indicator to indicate whether the processing circuit is in the first mode or the second mode.

22. The method of claim 21, further comprising updating the first configuration register in a boot mode of the processing circuit.

23. The method of claim 13, further comprising, in response to a second instruction configured to access first control information operative to control implementation of the first tag bits:
accessing the first control information in response to the processing circuit in the first mode; and
generating an exception signal in response to the processing circuit in the second mode.

24. The method of claim 23, further comprising:

in response to a second instruction configured to update second control information operative only in the first mode, disregarding the second instruction in response to the processing circuit in the second mode; and in response to a third instruction configured to read the second control information, returning predetermined values in response to the processing circuit in the second mode.

25. A processor-based system comprising:

a memory circuit; and a processing circuit comprising:

a mode indicator indicating the processing circuit in one of a first mode and a second mode;

an execution circuit; and a load/store circuit;

wherein:

in response to a first instruction to store first data to a first memory address in the memory circuit, the execution circuit is configured to control the load/store circuit to:

in response to the mode indicator indicating the processing circuit in the first mode:

read, from the memory circuit, first tag bits associated with the first memory address;

determine, based on the first tag bits, whether to store the first data to the first memory address; and store the first data to the first memory address based on the determination; and in response to the mode indicator indicating the processing circuit in the second mode:

store the first data to the first memory address without reading from the memory circuit; and the first tag bits associated with the first memory address are stored in a same cache line as the first data.

\* \* \* \* \*